(12) United States Patent
Negele

(10) Patent No.: US 6,182,989 B1
(45) Date of Patent: Feb. 6, 2001

(54) UTILITY VEHICLE WITH A RIGID AXLE

(75) Inventor: Erwin Negele, Schwabsoien (DE)

(73) Assignee: AGCO GmbH & Co, Marktoberdorf (DE)

( * ) Notice: Under 35 U.S.C. 154(b), the term of this patent shall be extended for 0 days.

(21) Appl. No.: 09/295,831

(22) Filed: Apr. 21, 1999

(30) Foreign Application Priority Data

Apr. 21, 1998 (GB) .................................................. 9808273

(51) Int. Cl.$^7$ .................................................. B60G 9/02
(52) U.S. Cl. ................................. 280/124.116; 280/755; 280/5.502
(58) Field of Search ............................. 280/754, 755, 280/124.116, 124.111, 124.112, 5.508, 5.502, 124.128, 124.153

(56) References Cited

U.S. PATENT DOCUMENTS

| 3,400,946 | * | 9/1968 | Bacher | 280/124.128 |
| 3,689,103 | * | 9/1972 | Meulendyk | 280/5.513 |
| 3,883,153 | * | 5/1975 | Singh et al. | 280/124.104 |
| 3,966,223 | * | 6/1976 | Carr | 280/124.128 |
| 4,230,341 | * | 10/1980 | Hart et al. | 280/124.128 |
| 4,453,737 | * | 6/1984 | Burchard et al. | 280/124.116 |
| 4,502,391 | * | 3/1985 | Hurni | 280/754 |
| 5,180,028 | * | 1/1993 | Perrenoud, Jr. | 280/6.11 |

FOREIGN PATENT DOCUMENTS

| 512550 | * | 11/1992 | (EP) . |
| 754576 | | 7/1993 | (EP) . |
| 803384 | | 4/1997 | (EP) . |
| 1371229 | | 10/1974 | (GB) . |

* cited by examiner

Primary Examiner—Michael Mar
Assistant Examiner—Lynda Jasmin
(74) Attorney, Agent, or Firm—MacMillan, Sobanski & Todd, LLC

(57) ABSTRACT

A utility vehicle ha a rigid axle that can be pivoted about a fixed swivel extending the longitudinal direction of the vehicle. The axle is mounted on a swinging link, with which the cylinder of a hydro-pneumatic spring suspension engages. Such vehicle are equipped with a spring suspension for road travel at speeds in excess of 40 km/hr. However, both the spring action and the swivel movement of the rigid axles are potentially dangerous when working on uneven or sloping ground. This invention permits both the spring action and the swivel movement of the rigid axle to be prevented. This invention is particularly well suited for vehicles used in agriculture, forestry, and construction.

12 Claims, 1 Drawing Sheet

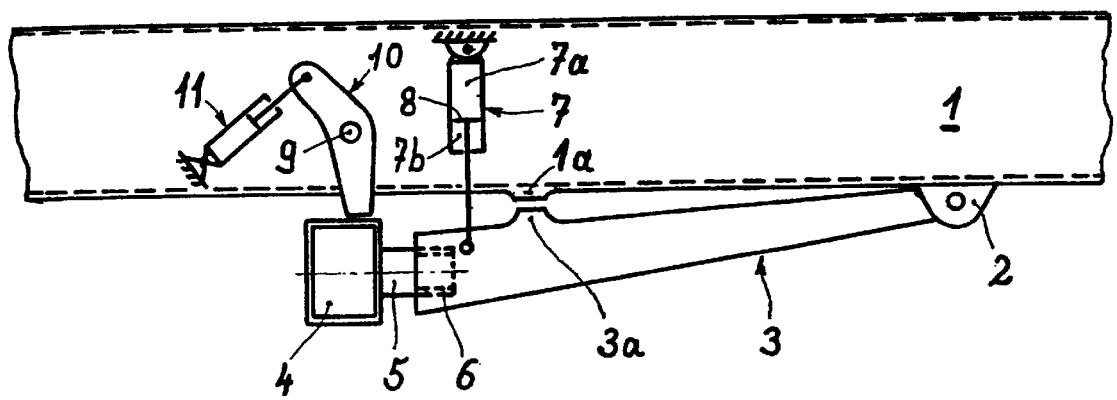

UTILITY VEHICLE WITH A RIGID AXLE

BACKGROUND TO THE INVENTION

The invention relates to a utility vehicle with a rigid axle, which can pivot about a swivel pin in a substantially vertical plane.

Such vehicles, for example agricultural tractors, are equipped with a spring suspension for the axle to allow road travel at speeds in excess of 40 km/h. When used in other situations, in particular when working on the land, the spring suspension can be problematic or can even make it impossible to carry out the work properly. As a result, the spring suspensions of these utility vehicles can be disabled as a rule. Typically, the axle is mounted on one or more swinging links extending in the longitudinal direction of the vehicle and with which the cylinder of a hydro-pneumatic spring suspension spring engages.

DE 195 26 346A1 describes the suspension of the steerable rigid axle of a utility vehicle, in which the spring suspension can be disabled by lowering the vehicle structure onto a stop secured onto the or each swinging link. The disadvantage caused by the spring suspension is eliminated as a result of this action; however, the rigid axle is still able to swing about the swivel pin so that when travelling on uneven terrain, the rigid axle is better able to adapt to the ground. However, in very difficult terrain, in particular when travelling across relatively steep hills or when working with a front-load tool, there may be a danger that the vehicle may tip or roll if the axle pivots in an undesirable manner.

SUMMARY OF THE INVENTION

The objective of this invention is to improve a vehicle of the generic type described above in order to overcome this disadvantage.

This objective is achieved by means which will at the same time allow the spring suspension to be disabled, and prevent the swivelling movement of the rigid axle.

The activation of these locks is of major importance in terms of technical safety since it ensures that, in the knowledge that the spring action and swivelling movement are prevented, the vehicle cannot be inadvertently placed in situations which might be critical as regards safety.

One technically simple and space-saving embodiment is provided by arranging a stop on each side of the vehicle which can be moved into the travel path and out of the travel path of the axle so as to prevent swivel moment hereof. The rigid axle can be brought to bear on stops positioned in its path of travel by actuators of a hydro-pneumatic spring suspension.

Preferable embodiments of the invention are claimed in dependent claims forming part of this specification.

BRIEF DESCRIPTION OF THE DRAWING

An embodiment of the invention will be described in more detail below with reference to the somewhat schematic drawing of a suspension for the rigid axle of a utility vehicle, depicted from the side, which is appended hereto.

DETAILED DESCRIPTION

The vehicle chassis is designated by reference 1 in the drawing. Arranged in a bearing 2 on the underside is a leading link 3 extending in the longitudinal direction of the vehicle, on the front end of which a rigid axle 4 with wheels, not illustrated, is mounted by means of a swivel pin 5 fitted to the body of the rigid axle 4 and engaging in a bearing 6 in the link 3. In the preferred embodiment, each main chassis member has a leading link, the foremost ends of which are connected by a cross member on which the axle is pivoted.

At least one actuator 7 of the vehicle's hydro-pneumatic spring suspension supported on the chassis 1 engages with the link 3 in the region of the forward end, for example on the cross member. Above the piston 8 which is slidable therein, the actuator 7 has a pressure chamber 7a, which is pressurised when the hydro-pneumatic spring suspension 12 is in operation. The height of the chassis 1 above the ground can be adjusted by delivering or discharging hydraulic medium to or from the pressure chamber 7a. When the chassis is in its lowest position, a stop 1a thereof lies on stop 3a of the linking member 3.

Above the rigid axle 4 on both sides of the vehicle, a pin 9 is arranged on the chassis 1, which forms a swivel bearing for a dual-arm lever 10. Engaging with the arm of the lever 10 remote from the rigid axle 4 is a swivel motor 11 (eg a fluid actuator), with the aid of which the lever 10 is swung out from the swivel position illustrated (in which the arm thereof adjacent to the rigid axle 4 lies in the travel path of the rigid axle 4) into a swivel position in which this arm is moved out of the path of travel. When the lever 10 is pivoted into the travel path of the rigid axle 4, it is brought to lie on the rigid axle 4 as the chassis i is lowered, so that the stops 1a, 3a remain out of contact. In critical situations in which there is a risk of the vehicle tipping over, the rigid axle 4 can be pushed against the swivel stops 1a and 3a by an auxiliary force. To this end, the chamber 7b underneath the piston 8 of the actuator 7 is designed so that pressurising medium can be applied to it, too. The chassis 1, the linking member 3 and the rigid axle 4 thus form a rigid unit, isolating the rigid axle 4 from either spring action or swivelling movement. This significantly reduces the risk of tipping.

When the lever 10 is pivoted out from the travel path of the rigid axle 4, the spring action of the rigid axle can be prevented whilst allowing free swivelling movement due to the fact that the chassis can be lowered until its stop 1a meets the stop 3a of the link 3. Here too, the chassis 1 and the link 3 form a rigid unit once pressure has been applied to the chamber 7b of the spring-suspension cylinder 7.

In order to bring the spring action into operation, the chassis 1 merely has to be raised by filling the pressure chamber 7a of the spring-suspension cylinder 7.

The invention therefore provides the following options for the axle:
1 free springing action and swivel movement
2 spring suspension disabled, free swivel movement
3 spring suspension disabled and swivel movement prevented
4 spring suspension disabled and axle positively urged against the levers 10.

In the case of options 2 and 3, the suspension may be eliminated by engagement of the stops 1a, 3a or by lever 10 under gravity; in the case of option 4, the chamber 7b is pressurised to give a positive prevention of axle movement relative to the chassis 1.

In a preferred embodiment, the vehicle includes an inclination sensor, the output of which is used to automatically restrict movement of the axle by operation of the levers 10 and cylinder 7. The suspension of the vehicle may typically be under microprocessor control, the freedom of movement of the axle being chosen to suit any operating conditions within the options outlined above according to the dangers of the terrain which are detected by on-board sensors.

What is claimed is:

1. A vehicular chassis and suspension assembly comprising:
   a chassis;
   a suspension arm connected to said chassis for pivoting movement relative thereto;
   an axle connected to said suspension arm for swiveling movement relative thereto;
   an actuator connected between said chassis and said suspension arm for selectively controlling said pivoting movement of said suspension arm relative to said chassis; and
   a lever supported on said chassis and selectively movable between a first position, wherein said lever restricts said swiveling movement of said axle relative to said chassis, and a second position, wherein said lever does not restrict said swiveling movement of said axle relative to said chassis.

2. The vehicular chassis and suspension assembly defined in claim 1 further including a bearing connected to said chassis that connects said suspension arm to said chassis for pivoting movement relative thereto.

3. The vehicular chassis and suspension assembly defined in claim 1 wherein said suspension arm is a leading link.

4. The vehicular chassis and suspension assembly defined in claim 1 further including a swivel pin connected to said axle that connects said axle to said suspension arm for swiveling movement relative thereto.

5. The vehicular chassis and suspension assembly defined in claim 1 wherein said axle is a rigid axle.

6. The vehicular chassis and suspension assembly defined in claim 1 further including a bearing connected to said chassis that connects said actuator to said chassis for pivoting movement relative thereto.

7. The vehicular chassis and suspension assembly defined in claim 1 wherein said actuator includes a cylinder connected to said chassis and a piston extending within said cylinder and connected to said suspension arm.

8. The vehicular chassis and suspension assembly defined in claim 7 wherein said piston defines first and second chambers within said cylinder, said suspension arm being moved to a first position relative to said chassis when pressurized fluid is supplied to said first chamber and being moved to a second position relative to said chassis when pressurized fluid is supplied to said second chamber.

9. The vehicular chassis and suspension assembly defined in claim 1 wherein said lever is supported on said chassis for pivoting movement between said first and second positions.

10. The vehicular chassis and suspension assembly defined in claim 1 further including a swivel motor for moving said lever between said first and second positions.

11. The vehicular chassis and suspension assembly defined in claim 10 wherein said swivel motor is a fluid actuator.

12. The vehicular chassis and suspension assembly defined in claim 1 further including stops formed on each of said chassis and said suspension arm, said stops engaging one another to limit said pivoting movement of said suspension arm relative to said chassis.

* * * * *